(12) United States Patent
Nakatsukasa et al.

(10) Patent No.: US 10,382,096 B2
(45) Date of Patent: Aug. 13, 2019

(54) INFORMATION COMMUNICATION DEVICE, INFORMATION COMMUNICATION SYSTEM, AND INFORMATION COMMUNICATION METHOD

(71) Applicant: MITSUBISHI ELECTRIC CORPORATION, Tokyo (JP)

(72) Inventors: Masahiro Nakatsukasa, Tokyo (JP); Yasunori Hoshihara, Tokyo (JP); Hisao Nakano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/757,743

(22) PCT Filed: Nov. 10, 2015

(86) PCT No.: PCT/JP2015/081591
§ 371 (c)(1),
(2) Date: Mar. 6, 2018

(87) PCT Pub. No.: WO2017/081742
PCT Pub. Date: May 18, 2017

(65) Prior Publication Data
US 2018/0351603 A1    Dec. 6, 2018

(51) Int. Cl.
*H04B 5/00* (2006.01)
*H01P 1/213* (2006.01)
*H01Q 13/20* (2006.01)
*H04B 3/52* (2006.01)
*H04L 12/42* (2006.01)

(52) U.S. Cl.
CPC .......... *H04B 5/0018* (2013.01); *H01P 1/213* (2013.01); *H01Q 13/203* (2013.01); *H04B 3/52* (2013.01); *H04B 5/00* (2013.01); *H04L 12/42* (2013.01)

(58) Field of Classification Search
CPC .......... H04B 5/0018; H04B 3/52; H04B 1/69; H04B 5/02; H04B 7/022; H04B 5/00; H04B 7/0413; H01Q 13/203; H01L 12/42
USPC ....................................................... 455/41.1
See application file for complete search history.

(56) References Cited

U.S. PATENT DOCUMENTS 5,528,582 A * 6/1996 Bodeep .............. H04N 7/17309
                                                348/E7.07
5,812,933 A * 9/1998 Niki ....................... H04B 7/155
                                                370/279

(Continued)

FOREIGN PATENT DOCUMENTS

JP        08-111657 A       4/1996
JP        2007-116251 A     5/2007

(Continued)

OTHER PUBLICATIONS

International Search Report, issued in PCT/JP2015/081591, dated Dec. 8, 2015.

*Primary Examiner* — Shaima Q Aminzay
(74) *Attorney, Agent, or Firm* — Birch, Stewart, Kolasch & Birch, LLP

(57) ABSTRACT

A control unit (22) controls a filter (30) of a communication device (3a) by wired communication via a LCX (4a) to pass or cut off a signal in a wireless frequency band, to cause the LCX (4a) and LCX (4b) to function as a single antenna or a plurality of antennas.

10 Claims, 11 Drawing Sheets

(56) References Cited

U.S. PATENT DOCUMENTS

| | | | |
|---|---|---|---|
| 6,337,754 B1* | 1/2002 | Imajo | H04B 10/25752 398/115 |
| 2006/0143662 A1* | 6/2006 | Easterling | H04N 5/50 725/76 |
| 2009/0097855 A1* | 4/2009 | Thelen | H04B 10/25752 398/115 |
| 2012/0127294 A1* | 5/2012 | Yamaguchi | H04N 5/361 348/73 |

FOREIGN PATENT DOCUMENTS

| | | |
|---|---|---|
| JP | 2007-318278 A | 12/2007 |
| JP | 2009-272905 A | 11/2009 |

* cited by examiner

INFORMATION COMMUNICATION DEVICE, INFORMATION COMMUNICATION SYSTEM, AND INFORMATION COMMUNICATION METHOD

TECHNICAL FIELD

The present invention relates to an information communication device, an information communication system, and an information communication method for transmitting and receiving information to and from a plurality of communication devices connected via leaky coaxial cables (hereinafter referred to as LCX).

BACKGROUND ART

LCX is a coaxial cable including an inner conductor, an insulator, an outer conductor, and an outer skin, and a plurality of slits is formed in the outer conductor at regular intervals. Further, out of a wired communication signal and a wireless communication signal supplied to the inner conductor, only the wireless communication signal is leaked through the slits. That is, the LCX functions as an antenna from which the wireless communication signal is output as a leakage radio wave, in addition to the function as a cable for transmitting the wired communication signal.

As a conventional technique using such an LCX, a wireless communication device described in Patent Literature 1 is cited. In this wireless communication device, a wireless fixed station is connected to an end portion of a coaxial cable installed in a house for wired communication, and an RF distributor and an LCX are provided to the end portion of the coaxial cable. With such a configuration, the LCX functions as an antenna and can communicate with a wireless mobile station.

For example, in a case of sending a television signal received by a television receiving antenna to a television terminal via a coaxial cable and the LCX, a wireless signal of a wireless LAN (Local Area Network) is mixed with the television signal and propagated to the LCX via the coaxial cable.

In the LCX, a slit is formed to leak a radio wave signal of the frequency of the wireless signal. With the configuration, the television signal is transmitted to the television terminal via the coaxial cable and the LCX, and the wireless signal is leaked from the LCX and received by the wireless mobile station.

Further, Patent Literature 2 describes a wireless communication system including a plurality of LCXs each connected to a plurality of wireless repeating devices and functioning as antennas, and a repeater connecting end portions of the plurality of LCXs. The repeater is a band-cut filter that cuts off a wireless signal in a frequency band that passes between LCXs, and repeats wireless signals in other frequency bands.

For example, even if an office where one LCX is installed and an office where the other LCX is installed via the repeater are offices of different companies, wireless data of a wireless LAN is cut off by the repeater. As a result, wireless data handled at one office does not leak from the LCX of the other office. In addition, wireless data in a frequency band handled by mobile phones is mutually transmitted to and from the wireless repeating device via the LCX and the repeater.

CITATION LIST

Patent Literatures

Patent Literature 1: JP 2007-318278 A
Patent Literature 2: JP 2007-116251 A

SUMMARY OF INVENTION

Technical Problem

In recent years, mobile communication terminals such as smart phones and tablet terminals have become widespread.

Such mobile communication terminals are typically capable of performing wireless communication such as Bluetooth (a registered trademark, hereinafter this description will be omitted), WiFi (a registered trademark, hereinafter this description will be omitted), or the like, and are often brought into a vehicle interior and used by a vehicle occupant. Therefore, there is an increasing demand for a system that links a mobile communication terminal and an in-vehicle device via the wireless communication. For example, there is a system that implements connection such as handsfree communication, mirror link, or the like between the mobile communication terminal and the in-vehicle device, using the wireless communication.

However, in the wireless communication in the vehicle interior, when the vehicle moves to the vicinity of a wireless communication access point that handles the same frequency band or a wireless communication device of an adjacent vehicle, the vehicle may suffer radio interference from these communication devices outside the vehicle.

Due to recent demands of wireless communication, wireless communication access points are installed in various places, and vehicles equipped with a wireless communication device are also increasing. Therefore, the radio interference from outside the vehicle with the wireless communication in the vehicle interior is a problem.

Also, the vehicle interior is a space surrounded by metal material, and there are structures such as a seat and a steering wheel, and occupants or objects get in and out. For this reason, radio waves are reflected or absorbed in the vehicle interior and multipath propagation occurs, and a propagation loss of the radio waves varies due to an influence of fading caused by the multipath propagation.

As described above, the wireless communication in the vehicle interior has a problem in that wireless communication quality is deteriorated due to the radio wave interference from outside the vehicle and the variation in the propagation loss of the radio waves.

Meanwhile, the wireless communication devices described in Patent Literatures 1 and 2 use the LCX as an antenna. By suppressing input power, the LCX can intentionally radiate the radio waves into a narrow space. Therefore, if the LCX is used as an antenna of an in-vehicle device, wireless communication is performed in a narrow space inside the vehicle interior, and the radio wave interference from outside of the vehicle is reduced.

However, the wireless communication device described in Patent Literature 1 is based on the assumption that the LCX is installed in a house, and the length and the number of the antennas implemented by the LCX cannot be adjusted. Therefore, even if the wireless communication device described in Patent Literature 1 is used as a wireless communication device in a vehicle interior, the wireless communication device cannot handle the variation in the propagation loss of the radio waves and deterioration of the wireless communication quality is expected. For example, in a vehicle, passengers or their baggage frequently get in and out. These passengers or their baggage can be shields for reflecting or absorbing the radio waves. Therefore, there is a possibility that the propagation loss of the radio waves in the vehicle interior substantially varies due to the incomings and outgoings of the passengers or their baggage.

Further, in the wireless communication device described in Patent Literature 2, the wireless data in the frequency band handled in one LCX is cut off by the repeater, and the wireless data in the other frequency bands is passed via the repeater and are propagated to the other LCX, among the wireless data propagated in the plurality of LCXs connected to the repeater. Therefore, the wireless communication device described in Patent Literature 2 can perform wireless communication of different frequency bands among the LCXs via the repeater. That is, the plurality of LCXs connected to the repeater can be used to function as antennas for performing the wireless communication of different frequency bands from one another.

However, the repeater described in Patent Literature 2 is a band-cut filter, and is configured as a resonant circuit composed of an inductor and a capacitor. For this reason, the frequency band that is passed through and is cut off by the repeater is fixed, and this frequency band cannot be freely adjusted. Therefore, even the wireless communication device described in Patent Literature 2 cannot handle the variation in the propagation loss of the radio waves in the vehicle interior, and may fail to secure the wireless communication quality.

The present invention solves the above problem, and an objective is to provide an information communication device, an information communication system, and an information communication method which are capable of preventing deterioration of the wireless communication quality in a network configured among the information communication device and a plurality of communication devices via a plurality of LCXs.

Solution to Problem

An information communication device according to the present invention includes a wired communicator, a wireless communicator, a signal mixing/separating unit, and a controller. The wired communicator performs wired communication with a plurality of communication devices via a plurality of LCXs each connected to filters provided in the plurality of communication devices. The wireless communicator transmits and receives a signal in a wireless frequency band, using the LCX as an antenna. The signal mixing/separating unit mixes signals from the wired communicator and the wireless communicator and outputs a mixed signal to the LCX, and separates a signal input from the LCX into a signal to the wired communicator and a signal to the wireless communicator. The controller controls the filter of the communication device by wired communication via the LCX to pass or cut off the signal in a wireless frequency band to cause the plurality of LCXs to function as a single antenna or a plurality of antennas.

Advantageous Effects of Invention

According to the present invention, in a network configured among an information communication device and a plurality of communication devices via a plurality of LCXs, the information communication device controls passage and cutoff of a signal in a wireless frequency band in a filter of a communication device by wired communication via an LCX to adjust the length and the number of antennas implemented by the LCXs. With the configuration, deterioration of the wireless communication quality in the network can be prevented.

DESCRIPTION OF EMBODIMENTS

Hereinafter, to describe the present invention in more detail, embodiments for implementing the present invention will be described with reference to accompanying drawings.

First Embodiment

Figure 1:
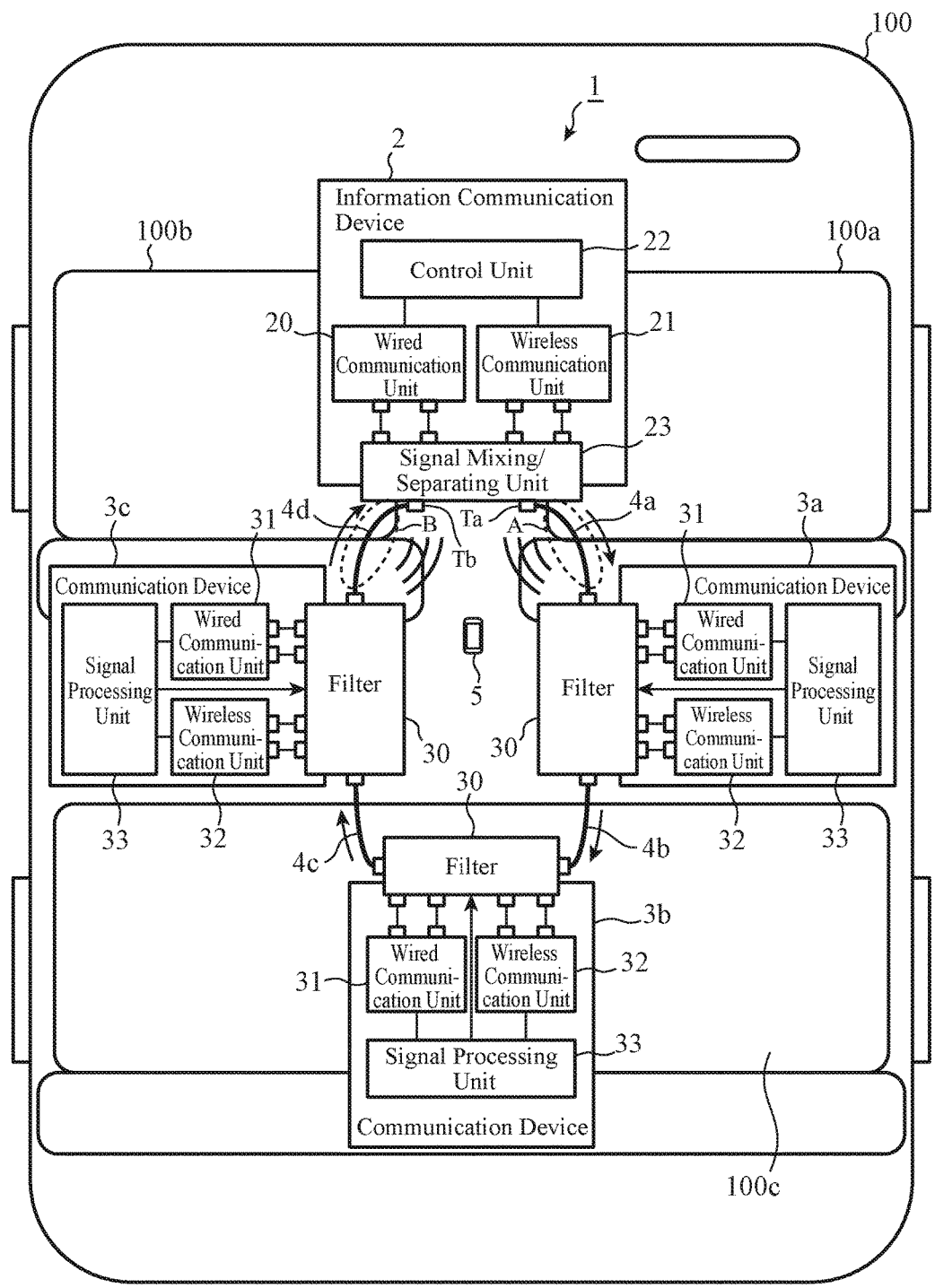
FIG. 1 is a block diagram illustrating a configuration of an information communication system according to a first embodiment of the present invention.

FIG. 1 is a block diagram illustrating a configuration of an information communication system 1 according to a first embodiment of the present invention. The information communication system 1 is a system mounted in a vehicle 100 and which transmits and receives information in its vehicle interior, and includes an information communication device 2, communication devices 3a to 3c, and LCXs 4a to 4d that connect the devices to one another.

Further, as illustrated in FIG. 1, the information communication device 2 and the communication device 3a are connected by the LCX 4*a*, and the communication device 3*a* and the communication device 3*b* are connected by the LCX 4*b*. The communication device 3*b* and the communication device 3*c* are connected by the LCX 4*c*, and the communication device 3*c* and the information communication device 2 are connected by the LCX 4*d*. Further, the LCX 4*a* is positioned near a driver's seat 100*a*, and the LCX 4*d* is positioned near a passenger seat 100*b*. The LCX 4*b* is positioned near a rear side of the driver's seat 100*a* in a back seat 100*c*, and the LCX 4*c* is positioned near a rear side of the passenger seat 100*b* in the back seat 100*c*.

A wired communication signal and a wireless communication signal can be mixed in inner conductors of the LCXs 4*a* to 4*d*, and a wireless communication signal in a predetermined wireless frequency band can be leaked through slits formed in outer conductors. With the configuration, the information communication system 1 can perform wired communication using the LCXs 4*a* to 4*d* as communication cables and wireless communication causing the LCXs 4*a* to 4*d* function as antennas.

The wired communication between the information communication device 2 and the communication devices 3*a* to 3*c* is one-way communication.

For example, as illustrated in FIG. 1, the information communication device 2 transmits a wired communication signal from an input/output terminal Ta of a signal mixing/separating unit 23 to the communication device 3*a* via the LCX 4*a*. As a result, the wired communication signal is sequentially transmitted from the communication device 3*a* to the LCX 4*b*, to the communication device 3*b*, to the LCX 4*c*, and to the communication device 3*c*, and is transmitted from the communication device 3*c* to an input/output terminal Tb of the signal mixing/separating unit 23 via the LCX 4*d*.

In the wireless communication between the information communication device 2 and a mobile communication terminal 5, all or any of the LCXs 4*a* to 4*d* radiates a radio wave to transmit a wireless communication signal, and an antenna of the mobile communication terminal 5 receives the wireless communication signal. Further, the antenna of the mobile communication terminal 5 radiates a radio wave to transmit a wireless communication signal, and all or any of the LCXs 4*a* to 4*d* receives the wireless communication signal.

Note that examples of the frequency band of the radio waves exchanged between the LCXs 4*a* to 4*d* and the mobile communication terminal 5 include 2.4 GHz band and 5 GHz band that are frequency bands of wireless LAN.

The communication device 3*a* receives the wired communication signal from the information communication device 2 at a preceding stage via the LCX 4*a* and transmits the received wired communication signal to the communication device 3*b* at a subsequent stage via the LCX 4*b*.

The communication device 3*b* receives the wired communication signal from the communication device 3*a* at the preceding stage via the LCX 4*b* and transmits the received wired communication signal to the communication device 3*c* at the subsequent stage via the LCX 4*c*.

The communication device 3*c* receives the wired communication signal from the communication device 3*b* at the preceding stage via the LCX 4*c* and transmits the received wired communication signal to the information communication device 2 at the subsequent stage via the LCX 4*d*.

Further, the communication devices 3*a* to 3*c* further include a filter 30 that passes and cut off the signal in the wireless frequency band propagated in the LCXs 4*a* to 4*d*.

Here, the LCX 4*a* and the LCX 4*b* are connected via the filter 30 of the communication device 3*a*, and the LCX 4*b* and the LCX 4*c* are connected via the filter 30 of the communication device 3*b*, and the LCX 4*c* and the LCX 4*d* are connected via the filter 30 of the communication device 3*c*.

For example, the information communication device 2 controls the filter 30 of the communication device 3*a* by wired communication via the LCX 4*a* to cut off the wireless communication signal in the 2.4 GHz band. Thus, the LCX 4*a* can be functioned as an antenna A that radiates a radio wave in the 2.4 GHz band.

Further, the information communication device 2 controls the filter 30 of the communication device 3*c* by wired communication via the LCX 4*d* to cut off the wireless communication signal in the 5 GHz band. Thus, the LCX 4*d* can be functioned as an antenna B that radiates a radio wave in the 5 GHz band.

The mobile communication terminal 5 is a communication terminal that performs wireless communication with the information communication device 2, and is implemented by, for example, a smartphone or a tablet terminal.

Note that the mobile communication terminal 5 may be a communication terminal capable of performing wireless communication with the information communication device 2, and examples of a wireless communication method include a wireless LAN such as WiFi, and Bluetooth.

Figure 2A:
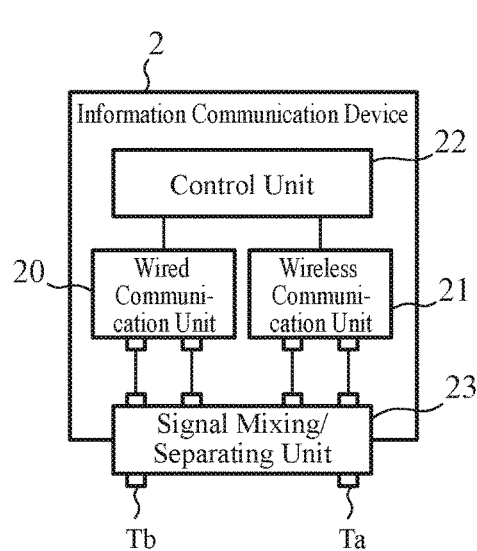
FIG. 2A is a block diagram illustrating a configuration of an information communication device according to the first embodiment.
Figure 2B:
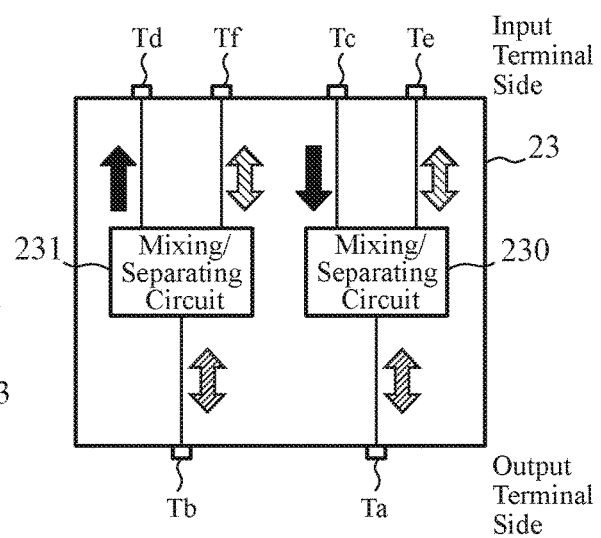
FIG. 2B is a block diagram illustrating a configuration of a signal mixing/separating unit.

FIG. 2A is a block diagram illustrating a configuration of the information communication device 2. FIG. 2B is a block diagram illustrating a configuration of the signal mixing/separating unit 23. The information communication device 2 is implemented by an in-vehicle device such as a navigation device or an audio device, and includes a wired communication unit 20, a wireless communication unit 21, a control unit 22, and the signal mixing/separating unit 23.

The wired communication unit 20 performs wired communication with the communication devices 3*a* to 3*c* by causing a wired communication signal to be propagated in the LCXs 4*a* to 4*d* that are used as communication cables.

Further, the wired communication unit 20 converts communication data to be transmitted to all or any of the communication devices 3*a* to 3*c* into a wired communication signal, and converts a wired communication signal received from all or any of the communication devices 3*a* to 3*c* into communication data addressed to the information communication device 2.

The wireless communication unit 21 transmits and receives the signal in the wireless frequency band to and from the mobile communication terminal 5, using all or any of the LCXs 4*a* to 4*d* as an antenna.

Further, the wireless communication unit 21 converts a wireless communication signal received from the mobile communication terminal 5 into communication data addressed to the information communication device 2, and converts communication data to be transmitted to the mobile communication terminal 5 into a wireless communication signal.

The control unit 22 is a control unit that controls operations of the wired communication unit 20, the wireless communication unit 21, the signal mixing/separating unit 23, and the communication devices 3*a* to 3*c*. In particular, the control unit 22 controls passage and cutoff of the signal in the wireless frequency band in the filter 30 by wired communication via any of the LCXs 4*a* to 4*d* to cause the LCXs 4*a* to 4*d* to function as a single antenna or a plurality of antennas.

For example, the control unit 22 transmits a control signal of the filter 30 of the communication device to the wired communication unit 20. The wired communication unit 20 converts the control signal received from the control unit 22 into a wired communication signal and transmits the control signal to the communication device having the filter 30 to be controlled, out of the communication devices 3a to 3c, by wired communication.

A signal processing unit 33 of the communication device controls passage and cutoff of the signal in the wireless frequency band in the filter 30 in accordance with the control signal.

In this way, the case where the LCXs 4a to 4d can be functioned as communication cables and the case where the LCXs 4a to 4d can be functioned as antennas and communication cables can be switched.

Further, the LCXs 4a to 4d can be functioned as a single antenna, in addition to the case where the LCXs 4a to 4d are caused to function as four antennas.

Further, the control unit 22 may control switching between the wired communication by a wired communication unit 31 and the wireless communication by a wireless communication unit 32. For example, the control unit 22 may instruct the communication device to convert communication data transmitted as a wired communication signal into a wireless communication signal by the wireless communication unit 32 to switch the communication to the wireless communication. With the control, convenience of the network of the information communication system 1 is markedly improved.

The control of the filter 30 for using all or a part of the LCXs 4a to 4d as an antenna or antennas is executed when a communication status of the wireless communication unit 21 becomes any of following statuses (1) to (4), for example. That is, the control unit 22 monitors the communication status of the wireless communication unit 21. When the control unit 22 determines that the communication status becomes any of the following statuses (1) to (4), the control unit 22 controls the filter 30 to use the LCXs 4a and 4d as a single antenna or a plurality of antennas.

The communication status (1) is a state where a reception level of radio waves received by the LCXs 4a to 4d is decreased. For example, when the reception level of the radio wave of the LCX that functions as an antenna, out of the LCXs 4a to 4d, tends to be gradually decreased or falls below an allowable level, the LCX to function as an antenna or the number of the LCXs is changed to make the communication status favorable.

The communication status (2) is a state where the speed of the wireless communication via the LCXs 4a to 4d is decreased. For example, when the speed of the wireless communication in the LCX that functions as an antenna, out of the LCXs 4a to 4d, tends to be gradually decreased or falls below an allowable level, the LCX to function as an antenna or the number of the LCXs is changed to make the communication status favorable.

The communication status (3) is a state where the number and positions of the mobile communication terminals 5 that perform the wireless communication with the wireless communication unit 21 via the LCXs 4a to 4d are detected. For example, when a connection request from the mobile communication terminal 5 is received by the LCX 4a to 4d, the number and positions of the mobile communication terminal 5 are detected from the number of communication connection requests and the reception level of radio waves by the LCXs, and the LCX that is close to the position of the mobile communication terminal 5 is caused to function as an antenna.

The communication status (4) is a status where transmission and reception of wireless communication signals in a plurality of wireless frequency bands are requested. For example, when the wireless communication in the 2.4 GHz band and the wireless communication in the 5 GHz band are requested, the control unit 22 sets one of the LCXs 4a to 4d to function as an antenna for the 2.4 GHz band, and another of the remaining LCXs 4a to 4d to function as an antenna for the 5 GHz band.

The signal mixing/separating unit 23 mixes transmission signals input from the wired communication unit 20 and the wireless communication unit 21 and outputs the mixed signal to the LCX 4a, and separates the signals received by the LCXs 4a to 4d into a signal to the wired communication unit 20 and a signal to the wireless communication unit 21.

For example, as illustrated in FIG. 2B, the signal mixing/separating unit 23 includes the input/output terminals Ta and Tb, an output terminal Tc and an input terminal Td for wired communication, input/output terminals Te and Tf for wireless communication, and mixing/separating circuits 230 and 231.

The input/output terminals Ta and Tb are terminals connected to the LCX, and are two terminals connected to the respective LCXs 4a and 4d in the ring topology network illustrated in FIG. 1.

Further, in the star topology network to be described below with reference to FIG. 12, the input/output terminals are provided by the number of communication devices. That is, at least two input/output terminals need be included in the signal mixing/separating unit 23.

The output terminal Tc and the input terminal Td are respectively connected to an output terminal and an input terminal of the wired communication unit 20, and the input/output terminals Te and Tf are connected to respective input/output terminals of the wireless communication unit 21. The number of the input/output terminals of the wireless communication unit 21 corresponds to the number of the output terminals of the signal mixing/separating unit 23. That is, the input/output terminals of the wireless communication unit 21 are provided by the number of the LCXs connected to the information communication device 2.

A transmission signal for wired communication and a transmission signal for wireless communication are output from the input/output terminal Ta, and a reception signal of wireless communication received by the LCX 4a is input to the input/output terminal Ta. A reception signal for wired communication and a reception signal for wireless communication received by the LCX 4d are input to the input/output terminal Tb, and a transmission signal for wireless communication is output from the input/output terminal Tb.

Figure 3:
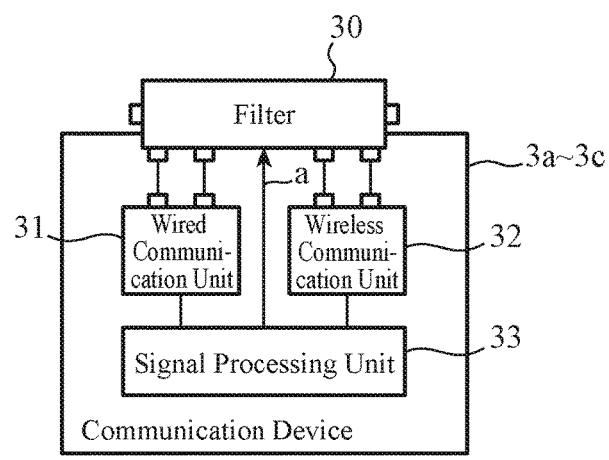
FIG. 3 is a block diagram illustrating a configuration of a communication device.
Figure 4:
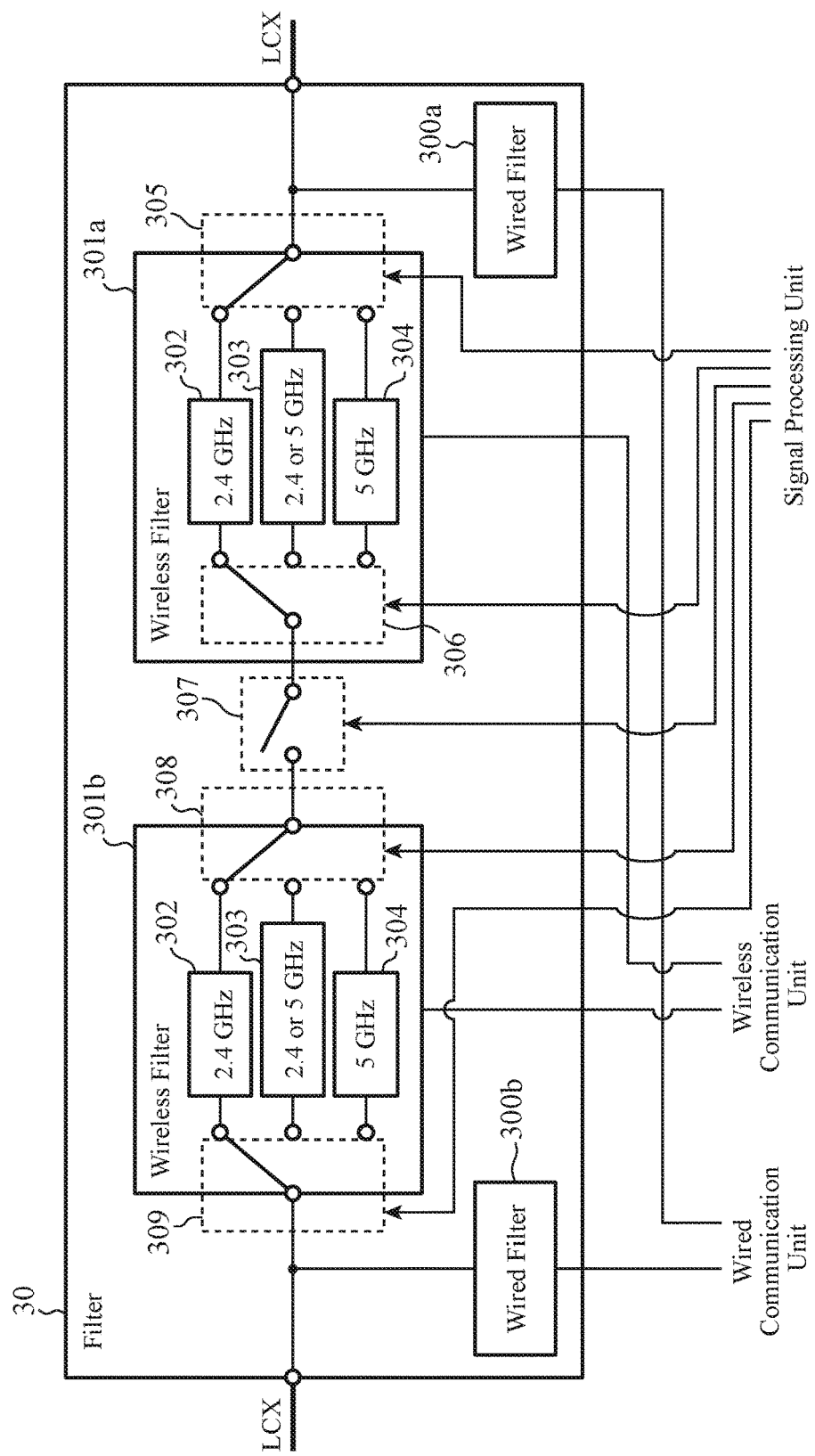
FIG. 4 is a block diagram illustrating a configuration of a filter provided in the communication device.

FIG. 3 is a block diagram illustrating a configuration of the communication devices 3a to 3c. Further, FIG. 4 is a block diagram illustrating a configuration of the filter 30 provided in the communication devices 3a to 3c.

The communication devices 3a to 3c are, for example, in-vehicle devices such as in-vehicle displays having a communication function, and include the filter 30, the wired communication unit 31, the wireless communication unit 32, and the signal processing unit 33, as illustrated in FIG. 3.

The filter 30 is a filter that passes and cuts off the signal in the wireless frequency band output to the LCX. The configuration of the filter 30 will be described below with reference to FIG. 4.

The wired communication unit 31 converts a wired communication signal propagated in the LCX and received via the filter 30 into communication data, and converts communication data to the communication device at the subsequent stage into a wired communication signal. Further, the wired communication unit 31 transmits the wired communication signal to the communication device at the subsequent stage via the filter 30.

The wireless communication unit 32 converts wireless communication signal propagated in the LCX and received via the filter 30 into communication data, and converts communication data to the information communication device 2 or to another communication device into a wireless communication signal. Further, the wireless communication unit 32 outputs the wireless communication signal to the LCX connected to the filter 30. As a result, a radio wave of the wireless communication signal is leaked from the LCX.

The signal processing unit 33 outputs communication data to the communication device at the subsequent stage to the wired communication unit 31, and processes the communication data from the communication device or the information communication device 2 at the preceding stage, the communication data having been input from the wired communication unit 31. Further, the signal processing unit 33 outputs communication data for the wireless communication to the wireless communication unit 32, and processes communication data input from the wireless communication unit 32. Note that an example of the information processing of the communication data includes reproduction processing of AV data input as the communication data.

Further, the signal processing unit 33 controls passage and cutoff of the signal in the wireless frequency band in the filter 30 in accordance with the control signal from the information communication device 2, which has been input as the communication data from the wired communication unit 31. For example, as illustrated in FIG. 3, the signal processing unit 33 outputs a control signal a corresponding to the control signal from the information communication device 2 to the filter 30 to control passage and cutoff of the signal in the wireless frequency band in the filter 30.

As illustrated in FIG. 4, the filter 30 includes wired filters 300a and 300b, wireless filters 301a and 301b, and switches 305 to 309.

The wired filter 300a is a filter that passes only the wired communication signal, of the signals propagated in the LCXs, and outputs the wired communication signal to the wired communication unit 31. Further, the wired filter 300b is a filter that passes only the wired communication signal to be transmitted to the communication device or the information communication device 2 at the subsequent stage, from the output signals of the wired communication unit 31, and outputs the wired communication signal to the LCX.

The wireless filters 301a and 301b are filters that pass and cut off the signal in the wireless frequency band in accordance with the control signal from the signal processing unit 33, and include band-pass filters 302 to 304. The band-pass filter 302 is a band-pass filter that passes a signal in the 2.4 GHz band. The band-pass filter 303 is a band-pass filter that passes signals in the 2.4 GHz band and in the 5 GHz band. The band-pass filter 304 is a band-pass filter that passes the signal in the 5 GHz band.

The switch 305 switches the filter to be connected by the LCX, from among the band-pass filters 302 to 304 of the wireless filter 301a, in accordance with the control signal from the signal processing unit 33.

The switch 306 switches the filter to be an output source, from among the band-pass filters 302 to 304 of the wireless filter 301a, in accordance with the control signal from the signal processing unit 33.

The switch 307 is a switch that turns on and off connection between the wireless filter 301a and the wireless filter 301b in accordance with the control signal from the signal processing unit 33.

The switch 308 switches the filter to which the output signal of the wireless filter 301a is input, from among the band-pass filters 302 to 304 of the wireless filter 301b in accordance with the control signal from the signal processing unit 33.

The switch 309 switches the filter to be an output source, from among the band-pass filters 302 to 304 of the wireless filter 301b, in accordance with the control signal from the signal processing unit 33.

For example, in a case where two LCXs connected to the preceding stage and the subsequent stage of the filter 30 are caused to function as a single 2.4 GHz band antenna, the wireless filters 301a and 301b may just be connected and pass the signal in the 2.4 GHz.

That is, in the wireless filter 301a, the switch 305 and the switch 306 are switched to the band-pass filter 302. The connection between the wireless filter 301a and the wireless filter 301b is turned on by the switch 307. In the wireless filter 301b, the switch 308 and the switch 309 are switched to the band-pass filter 302.

As a result, the signal in the 2.4 GHz band is passed through and the signal in the 5 GHz band is cut off by the filter 30, and the two LCXs connected at the preceding stage and the subsequent stage of the filter 30 can be caused to function as one antenna in the 2.4 GHz band.

Further, in a case where the LCX connected at the preceding stage of the filter 30 is caused to function as an antenna in the 2.4 GHz band, and the LCX connected to the subsequent stage is caused to function as an antenna in the 5 GHz band, the connection between the wireless filters 301a and 301b is disconnected. Then, the signal in the 2.4 GHz band is passed through the wireless filter 301a, and the signal in the 5 GHz band is passed through the wireless filter 301b.

That is, in the wireless filter 301a, the switch 305 and the switch 306 are switched to the band-pass filter 302. The connection between the wireless filter 301a and the wireless filter 301b is turned off by the switch 307. In the wireless filter 301b, the switch 308 and the switch 309 are switched to the band-pass filter 304.

As a result, the two LCXs connected to the preceding stage and the subsequent stage of the filter 30 can be caused to function as an antenna in the 2.4 GHz band and an antenna in the 5 GHz band.

Next, an operation will be described.

Figure 5:
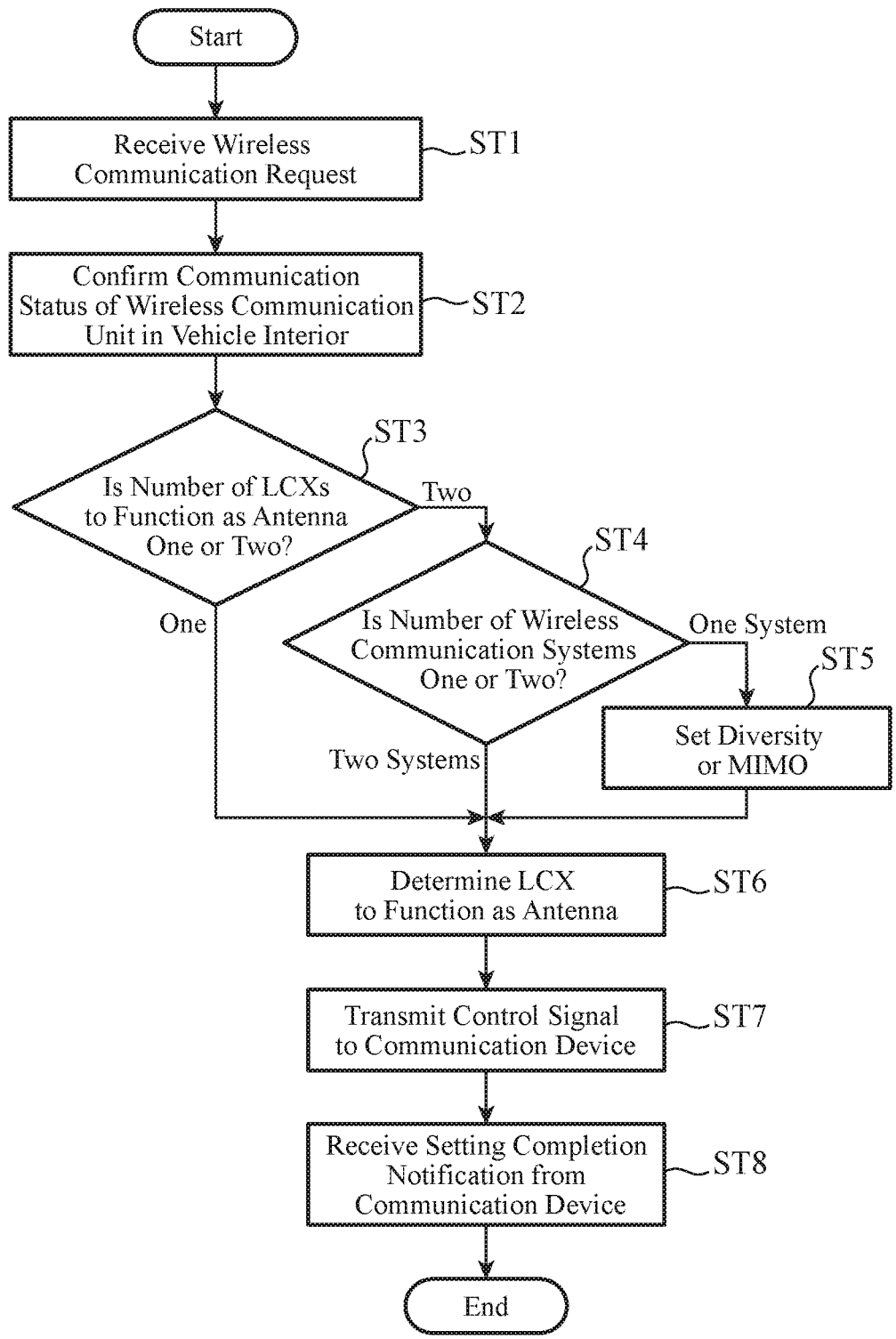
FIG. 5 is a flowchart illustrating an operation of the information communication device according to the first embodiment.

FIG. 5 is a flowchart illustrating an operation of the information communication device 2, and illustrates a series of processing regarding wireless communication using the LCX as the antenna in the information communication system 1.

The series of processing regarding wireless communication embodies processing of the following three steps by the control unit 22.

That is, the processing in steps ST1 and ST2 in FIG. 5 corresponds to a step in which the control unit 22 confirms the communication status by the wireless communication unit 21.

The processing from steps ST3 to ST6 corresponds to a step in which the control unit 22 determines the LCX to function as an antenna, out of the LCXs 4a to 4d, in accordance with the communication status of the wireless communication unit 21. The processing in steps ST7 and ST8 corresponds to a step in which the control unit 22 controls passage and cutoff of the signal in the wireless frequency band by the filter 30 to cause the LCX selected in the determination to function as an antenna. Therefore, the series of processing regarding wireless communication of the information communication device 2 will be clarified by describing respective steps illustrated in FIG. 5, and thus hereinafter the description will be given on the basis of FIG. 5.

First, when a connection request signal of the wireless communication from the mobile communication terminal 5 is received by one of the LCXs 4a and 4d, this connection request signal is transmitted to the information communication device 2. The wireless communication unit 21 of the information communication device 2 inputs the wireless communication signal via the signal mixing/separating unit 23, converts the wireless communication signal into communication data, and outputs the communication data to the control unit 22. As a result, the control unit 22 receives the connection request signal as the communication data (step ST1).

Note that, hereinafter, a case in which the wireless communication of the 2.4 GHz band and the 5 GHz band is possible in the information communication system 1, and at least one of the LCX 4a and the LCX 4d connected to the information communication device 2 functions as an antenna will be described as an example.

Next, the control unit 22 confirms the communication status of the wireless communication unit 21 in the vehicle interior (step ST2). For example, the reception level of the radio wave received by the LCX, the speed of the wireless communication, the information of the number and the positions of mobile communication terminals 5, and the frequency band of the wireless communication requested for connection by the mobile communication terminal 5 are acquired from the wireless communication unit 21. The control unit 22 confirms which of the communication statuses (1) to (4) the current communication status corresponds to on the basis of the aforementioned information.

The control unit 22 determines the number of the LCXs to function as an antenna, out of the LCX 4a and the LCX 4d, in accordance with to the communication status of the wireless communication unit 21 confirmed in step ST2 (step ST3). For example, in a case where one of the LCX 4a and the LCX 4d is used for the wireless communication, the number of LCXs to function as an antenna is one. Further, in a case where both the LCX 4a and the LCX 4d are used for the wireless communication, the number of LCXs to function as an antenna is two.

In a case where the number of LCXs to function as the antenna is determined to be two (two in step ST3), the control unit 22 determines whether the system of the wireless communication is one system or two systems in accordance with the communication status of the wireless communication unit 21 (step ST4).

For example, in a case where there are a connection request for the wireless communication in the 2.4 GHz band from the mobile communication terminal 5 and a connection request for the wireless communication in the 5 GHz band from another mobile communication terminal 5, two systems of the wireless communication in the 2.4 GHz band and the wireless communication in the 5 GHz band are set.

In a case where there is a connection request for the wireless communication in the 2.4 GHz band or the 5 GHz band, one system of the wireless communication in the 2.4 GHz band or the 5 GHz band is set.

When the system of the wireless communication is determined to be one system (one system in step ST4), the control unit 22 sets the wireless communication unit 21 to perform diversity wireless communication or multiple input/output (hereinafter referred to as MIMO) wireless communication in accordance with the communication status of the wireless communication unit 21 (step ST5). For example, in a case where the reception level of the radio wave received by the LCX 4a or the LCX 4d is decreased or the speed of the wireless communication is decreased, the control unit 22 sets the wireless communication unit 21 to perform the diversity wireless communication or the MIMO wireless communication.

In doing so, radio waves in the same frequency band are transmitted and received by the two LCXs, and thus improvement of the wireless communication quality and speeding up can be achieved.

Meanwhile, in a case where the number of the LCXs to function as an antenna is one (one in step ST3), when the systems of the wireless communication are determined to be two systems (two systems in step ST4) or when the processing of step ST5 is completed, the processing proceeds to step ST6.

In step ST6, the control unit 22 determines the LCX to function as an antenna in accordance with the communication status of the wireless communication unit 21.

For example, when the mobile communication terminal 5 is positioned near the passenger seat 100b and the wireless communication in the 2.4 GHz band is performed with the mobile communication terminal 5, the control unit 22 determines the LCX 4d as the LCX to function as an antenna in the 2.4 GHz band.

Further, consider a case in which the mobile communication terminals 5 are each positioned in the driver's seat 100a and the passenger seat 100b, and the wireless communication in the 2.4 GHz band is performed with the mobile communication terminal 5 on the driver's seat 100a side and the wireless communication in the 5 GHz is performed with the mobile communication terminal 5 on the passenger seat 100b. In this case, the control unit 22 determines the LCX 4a as the LCX to function as an antenna in the 2.4 GHz band, and determines the LCX 4d as the LCX to function as an antenna in the 5 GHz band.

Next, the control unit 22 generates a control signal of the filter 30 for causing the LCX determined as described above to function as an antenna, and outputs the control signal to the wired communication unit 20.

The wired communication unit 20 converts the control signal from the control unit 22 into a wired communication signal and outputs the wired communication signal to the signal mixing/separating unit 23. The signal mixing/separating unit 23 outputs the wired communication signal from the wired communication unit 20 to the LCX 4a. As a result, the control signal from the control unit 22 is transmitted to the communication device provided with the filter 30 to be controlled. The processing so far corresponds to step ST7.

For example, in a case where the LCX 4d is caused to function as an antenna in the 2.4 GHz band, the control signal for cutting off the signal in the 2.4 GHz band in the filter 30 is transmitted to the communication device 3c.

After that, the control unit 22 receives a setting completion notification from the communication device to which the control signal has been transmitted (step ST8). The setting completion notification is a notification indicating that the setting of the filter 30 in accordance with the control signal is completed. For example, in a case where the LCX 4d is caused to function as an antenna in the 2.4 GHz band, the setting completion notification indicating that the setting to cut off the signal in the 2.4 GHz band by the filter 30 has been performed is transmitted by wired communication from the communication device 3c to the information communication device 2.

With the notification, the wireless communication unit 21 is brought into a state of being able to execute the wireless communication using the LCX to function as an antenna, and the series of processing illustrated in FIG. 5 is terminated.

After the processing of step ST8 is completed, the control unit 22 returns to step ST2 to check the communication status of the wireless communication unit 21, and repeats the processing from step ST3 according to the communication status, while the information communication system 1 is being activated.

Figure 6:
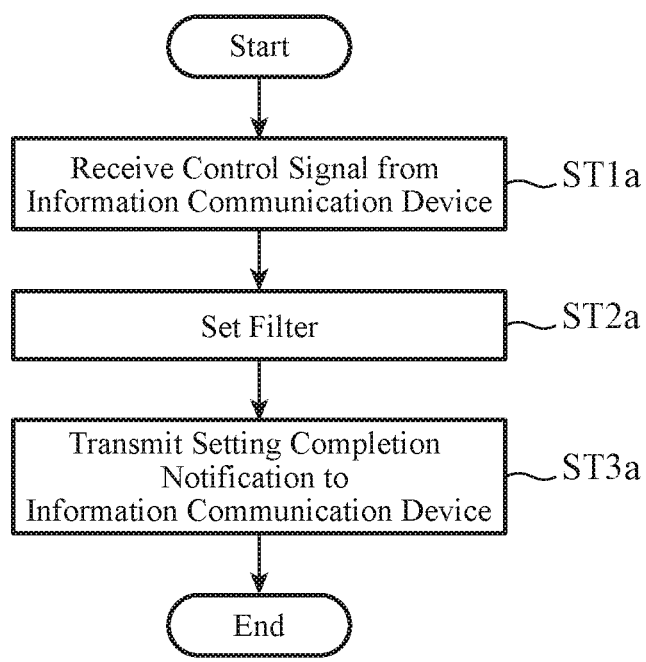
FIG. 6 is a flowchart illustrating an operation of the communication device.

FIG. 6 is a flowchart illustrating an operation of the communication devices 3a to 3c, and illustrates a series of processing when a control signal is received from the information communication device 2. A case in which the control signal for cutting off the signal in the 2.4 GHz band by the filter 30 is transmitted to the communication device 3c will be described as an example.

The wired communication unit 31 of the communication device 3c receives the control signal from the information communication device 2 via the filter 30 (step ST1a). This control signal is output from the wired communication unit 31 to the signal processing unit 33. The signal processing unit 33 sets control details indicated by the control signal to the filter 30 (step ST2a). With the setting, the filter 30 of the communication device 3c becomes the filter that cuts off the signal in the 2.4 GHz band.

After that, the signal processing unit 33 outputs the setting completion notification to the wired communication unit 31. The wired communication unit 31 transmits the setting completion notification to the information communication device 2 by wired communication via the LCX 4d (step ST3a). In this way, the number of the antennas and the wireless frequency band handled by the antenna can be appropriately changed in accordance with the communication status of the wireless communication without changing the original network topology.

Figure 7:
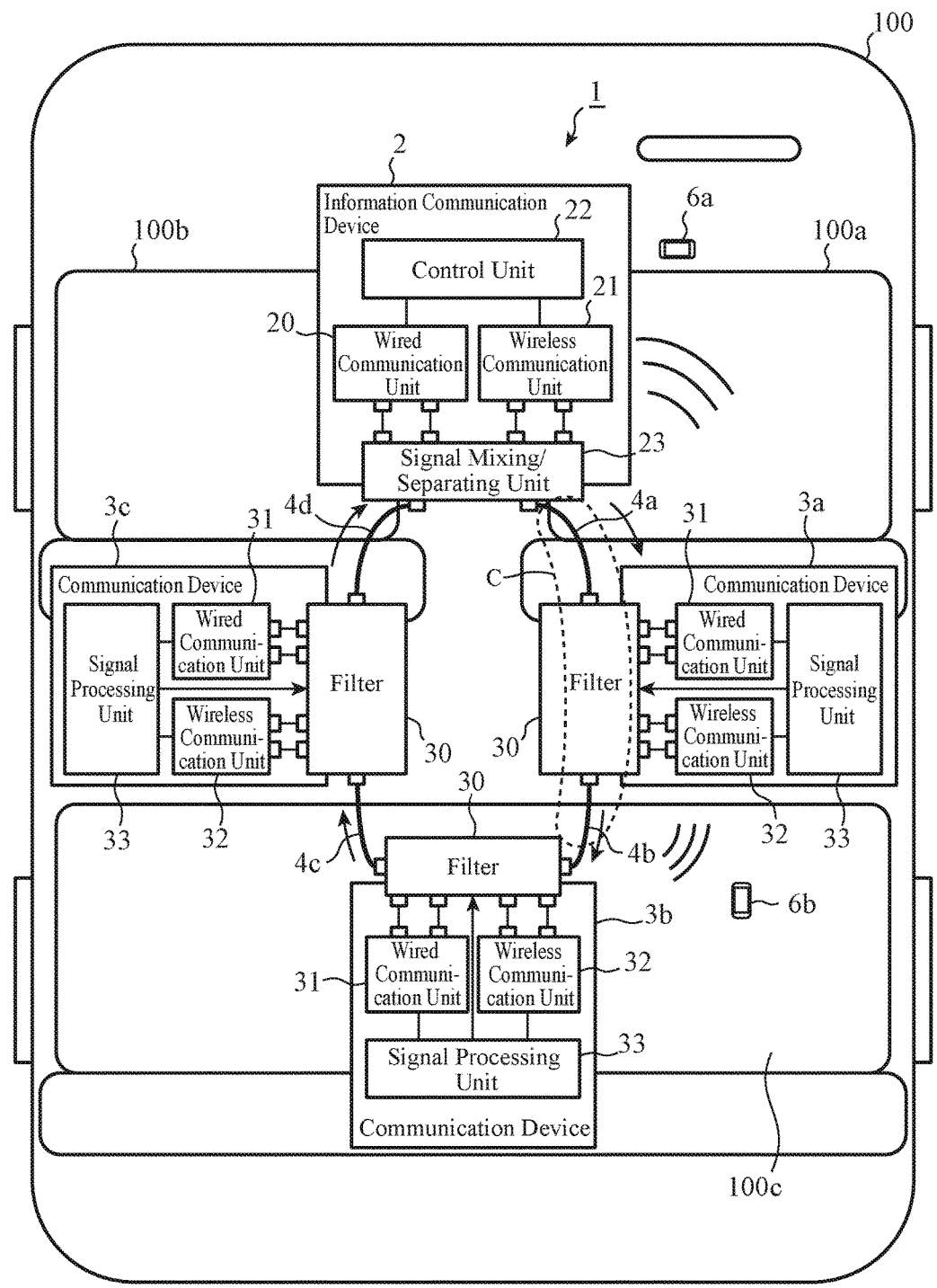
FIG. 7 is a diagram illustrating an outline of a case where the number of LCXs to function as antennas is two and the number of wireless communication systems is one.

FIG. 7 is a diagram illustrating an outline of a case where the number of the LCXs to function as antennas is two and the number of the wireless communication systems is one. Here, a case in which respective mobile communication terminals 6a and 6b supporting the 2.4 GHz band are positioned near the driver's seat 100a and on a side of the driver's seat 100a of the back seat 100c. In this case, the control unit 22 performs control to pass the signal in the 2.4 GHz band by the filter 30 of the communication device 3a and cut off the signal in the 2.4 GHz band by the filter 30 of the communication device 3b. As a result, as illustrated in FIG. 7, the LCX 4a and the LCX 4b function as one antenna C in the 2.4 GHz band.

By causing the plurality of LCXs connected via the filters 30 to function as one antenna as described above, the radiation range of the radio waves can be expanded and the antenna can be made substantially long. Note that the number of the LCXs to function as an antenna can be one depending on the communication status of the wireless communication. That is, according to the present invention, the length of the antenna implemented by the LCX can be adjusted in accordance with the communication status of the wireless communication.

Figure 8:
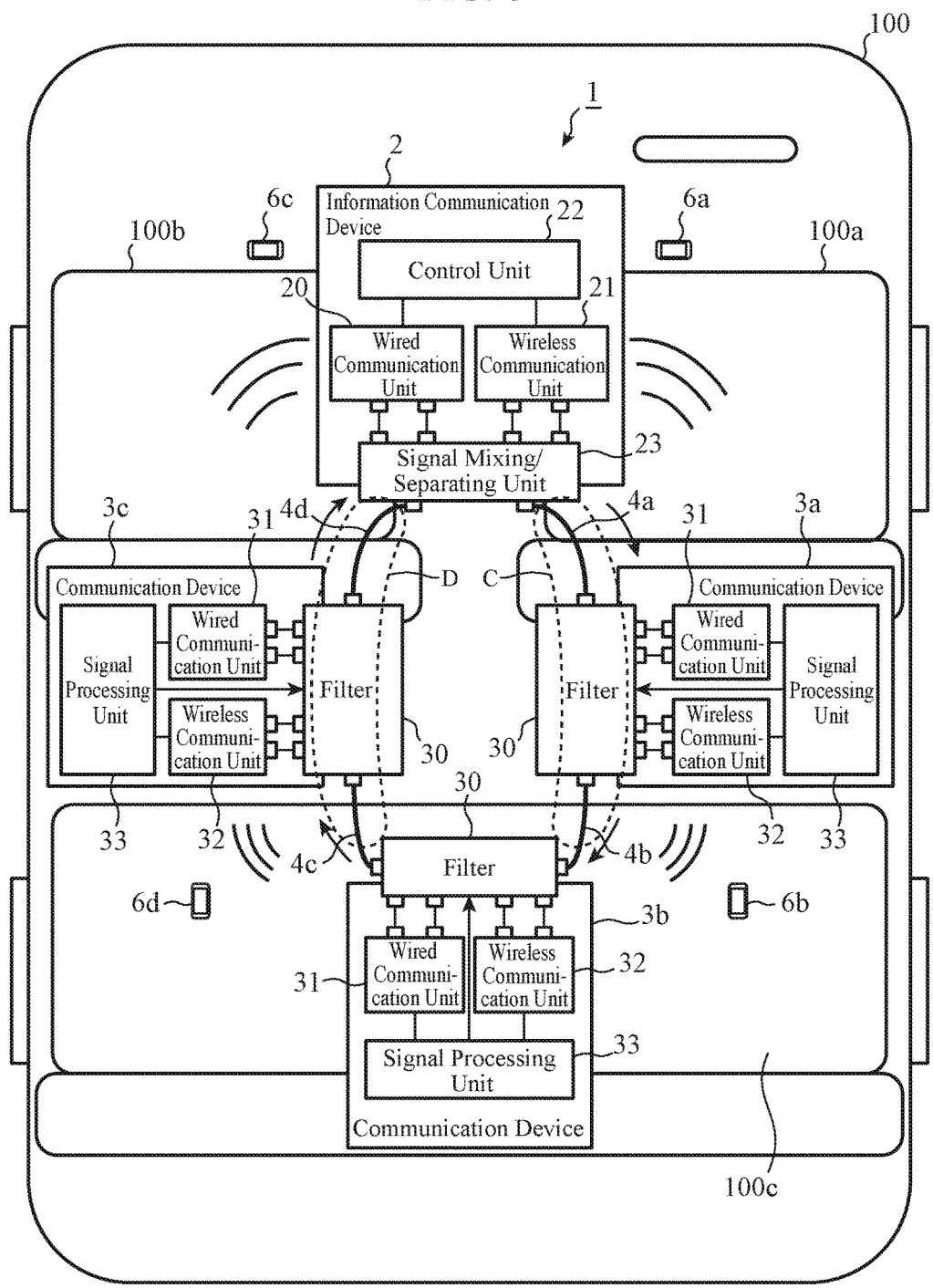
FIG. 8 is a diagram illustrating an outline of a case where the number of LCXs to function as antennas is two and the number of wireless communication systems is two.

FIG. 8 is a diagram illustrating an outline of a case where the number of the LCXs to function as antennas is four and the number of the wireless communication systems is two. Here, the mobile communication terminal 6a that supports the 2.4 GHz band is positioned near the driver's seat 100a, and the mobile communication terminal 6b that supports the 2.4 GHz band is positioned on a side of the driver's seat 100a of the back seat 100c. In addition, a mobile communication terminal 6c that supports the 5 GHz band is positioned near the passenger seat 100b, and a mobile communication terminal 6d that supports the 5 GHz band is positioned on a side of the passenger seat 100b of the back seat 100c.

In this case, the control unit 22 passes the signal in the 2.4 GHz band by the filter 30 of the communication device 3a and passes the signal in the 5 GHz band by the filter 30 of the communication device 3c. Further, both the signal in the 2.4 GHz band and the signal in the 5 GHz band can be cut off by the filter 30 of the communication device 3b. As a result, as illustrated in FIG. 8, the LCX 4a and the LCX 4b function as one antenna C of the 2.4 GHz band, and the LCX 4c and LCX 4d function as one antenna D of the 5 GHz band.

In this way, a plurality of systems, in each of which a plurality of the LCXs connected via the filter 30 functions as one antenna, can be provided. Note that the antenna implemented by the plurality of LCXs can be one system depending on the communication status of the wireless communication.

That is, according to the present invention, the number of antennas implemented by the LCX in accordance with the communication status of the wireless communication can be changed.

Next, an operation of a case where LCX provided in a ring topology is disconnected will be described.

Figure 9:
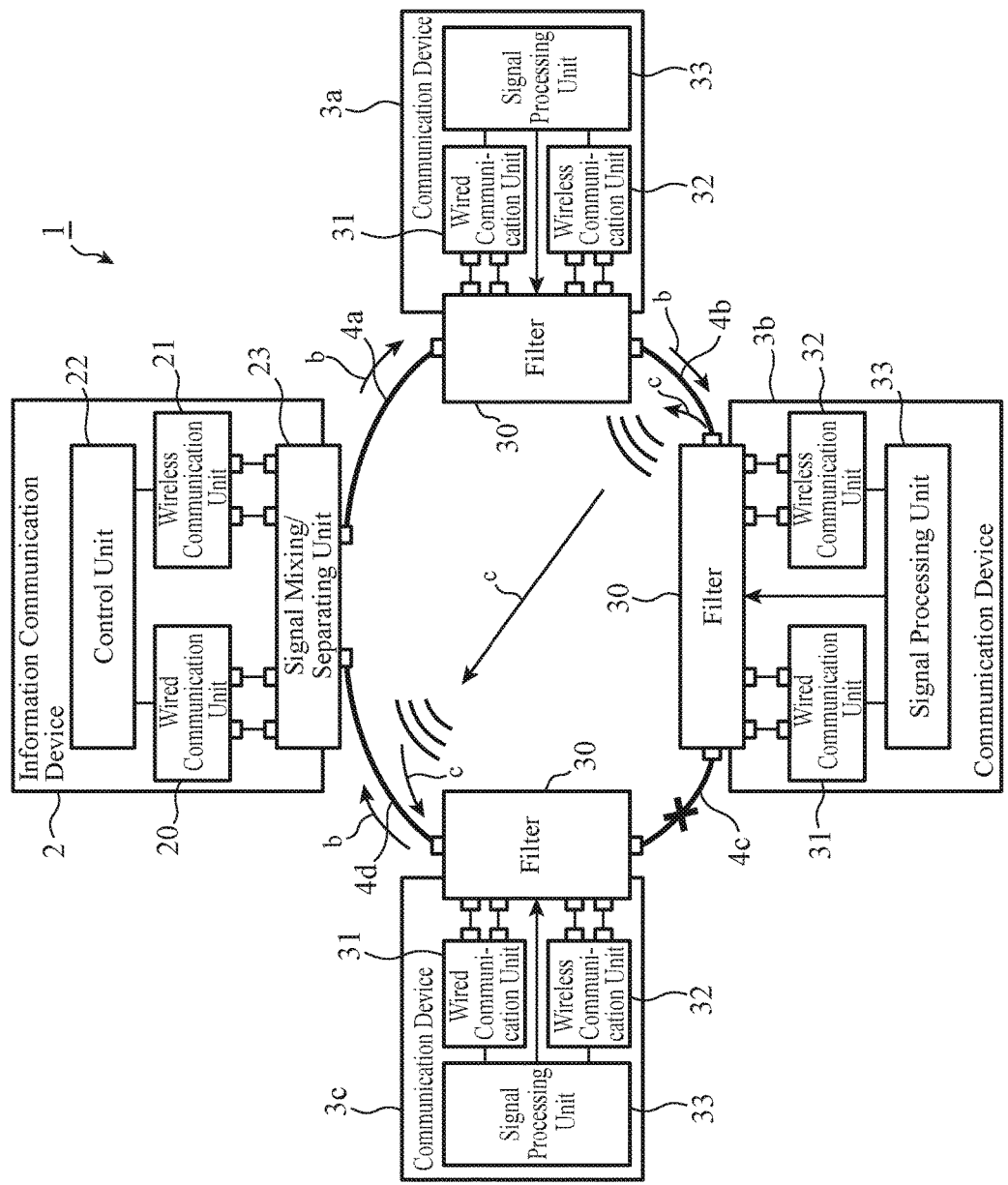
FIG. 9 is a diagram illustrating an information communication system in which an LCX that configures a ring topology is disconnected.

FIG. 9 is a diagram illustrating the information communication system 1 in which the LCX provided in a ring topology is disconnected, and illustrates a case in which the LCX 4c in the information communication system 1 illustrated in FIG. 1 is disconnected. As illustrated in FIG. 9, when the LCX 4c is disconnected, the control unit 22 of the information communication device 2 detects this disconnection. Then, the control unit 22 converts a wired communication signal b to be transmitted from the communication device 3b to the communication device 3c connected to each other by the LCX 4c into a wireless communication signal c, and causes the communication device 3b to transmit the wireless communication signal c to the communication device 3c by wireless communication. As a result, even if the LCX is disconnected, cutoff of the communication in the network can be avoided.

Figure 10:
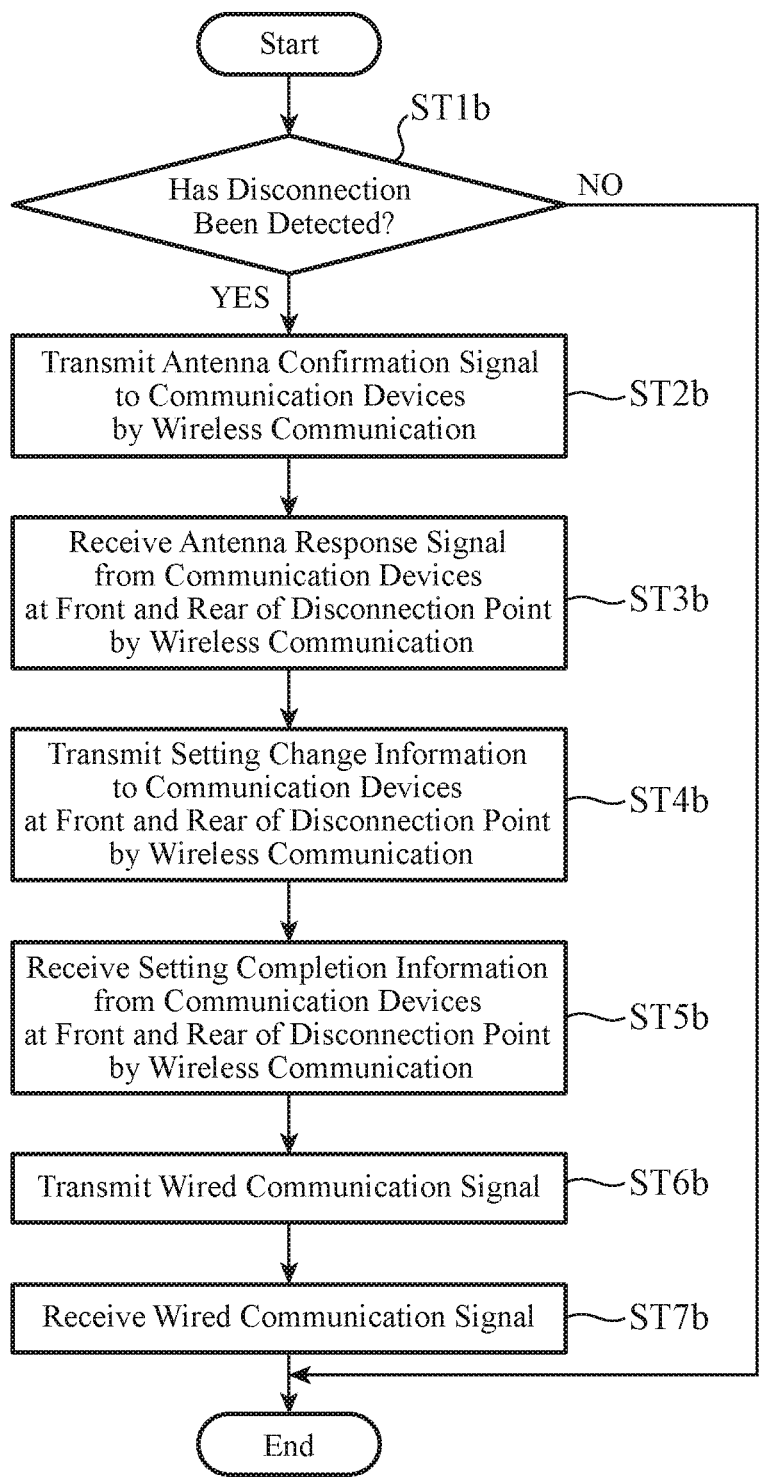
FIG. 10 is a flowchart illustrating an operation of the information communication device when an LCX is disconnected.

FIG. 10 is a flowchart illustrating the operation of the information communication device 2 when the LCX is disconnected, and illustrates the operation of the information communication device 2 in the state illustrated in FIG. 9.

First, the control unit 22 confirms whether the LCX is disconnected on the basis of a result of wired communication (step ST1b). In the ring topology, the wired communication signal transmitted from the information communication device 2 is propagated in order of the communication device 3a, the communication device 3b, and the communication device 3c, and finally returns to the information communication device 2. When the control unit 22 does not receive the wired communication signal, the control unit 22 determines that the LCX connected to any of the communication devices 3a to 3c is disconnected.

When the LCX is determined not to be disconnected (NO in step ST1b), the processing in FIG. 10 is terminated.

When the LCX is determined to be disconnected (YES in step ST1b), the control unit 22 transmits an antenna confirmation signal to the communication devices 3a to 3c by wireless communication via the wireless communication unit 21 after the lapse of a predetermined time from the detection of the disconnection (step ST2b).

When the antenna confirmation signal has been received by the two LCXs connected to the communication devices 3a to 3c, the wireless communication units 32 of the communication devices 3a to 3c do not return an antenna response signal.

Therefore, if either one of the two LCXs connected to the filters 30 is disconnected, the antenna response signal is transmitted from the communication devices to the information communication device 2.

If the LCX is disconnected, the wireless communication unit 21 receives the antenna response signal from the communication devices positioned at the front and the rear of the disconnection point (step ST3b). For example, as illustrated in FIG. 9, when the LCX 4c is disconnected, the antenna response signal is transmitted from the communication device 3b and the communication device 3c to the information communication device 2.

Since the control unit 22 can identify the communication devices 3a to 3c that configure the network by numbering or the like, the control unit 22 can specify the communication device that has returned the antenna response signal.

As a result, the control unit 22 can determine that the LCX 4c that connects the communication device 3b and the communication device 3c is the disconnection point.

Next, the control unit 22 transmits setting change information to the communication devices 3b and 3c, which are connected to the disconnected LCX 4c, via the wireless communication unit 21 by wireless communication (step ST4b).

The setting change information is control information for changing setting to cause the communication device at the preceding stage of the disconnection point to convert the wired communication signal into the wireless communication signal, and for changing setting to cause the communication device at the subsequent stage of the disconnection point to convert the wireless communication signal into the wired communication signal.

For example, in the case of FIG. 9, the wired communication unit 31 of the communication device 3b converts the wired communication signal b received via the LCX 4b and the filter 30 into communication data and outputs the communication data to the signal processing unit 33. The signal processing unit 33, which has received the setting change information, outputs the communication data input from the wired communication unit 31 to the wireless communication unit 32. The wireless communication unit 32 converts the communication data input from the signal processing unit 33 into the wireless communication signal c. After changing the setting in this manner, the communication devices 3b and 3c return setting completion information to the information communication device 2.

The wireless communication unit 21 of the information communication device 2 receives the setting completion information from the communication devices 3b and 3c positioned at the front and the rear of the disconnection point (step ST5b). The setting completion information is output from the wireless communication unit 21 to the control unit 22. After that, the control unit 22 transmits the communication data to the wired communication unit 20. The wired communication unit 20 converts the communication data received from the control unit 22 into the wired communication signal b and transmits the wired communication signal b by wired communication (step ST6b).

The wired communication signal b is converted into the wireless communication signal c by the communication device 3b at the preceding stage of the disconnection point, transmitted in a wireless manner, and received in a wireless manner by the communication device 3c at the subsequent stage of the disconnection point.

After that, the wireless communication signal c is converted into the wired communication signal b in the communication device 3c, and transmitted in a wired manner to the information communication device 2 via the LCX 4d. As a result, the wired communication unit 20 of the information communication device 2 receives the wired communication signal b (step ST7b).

Figure 11:
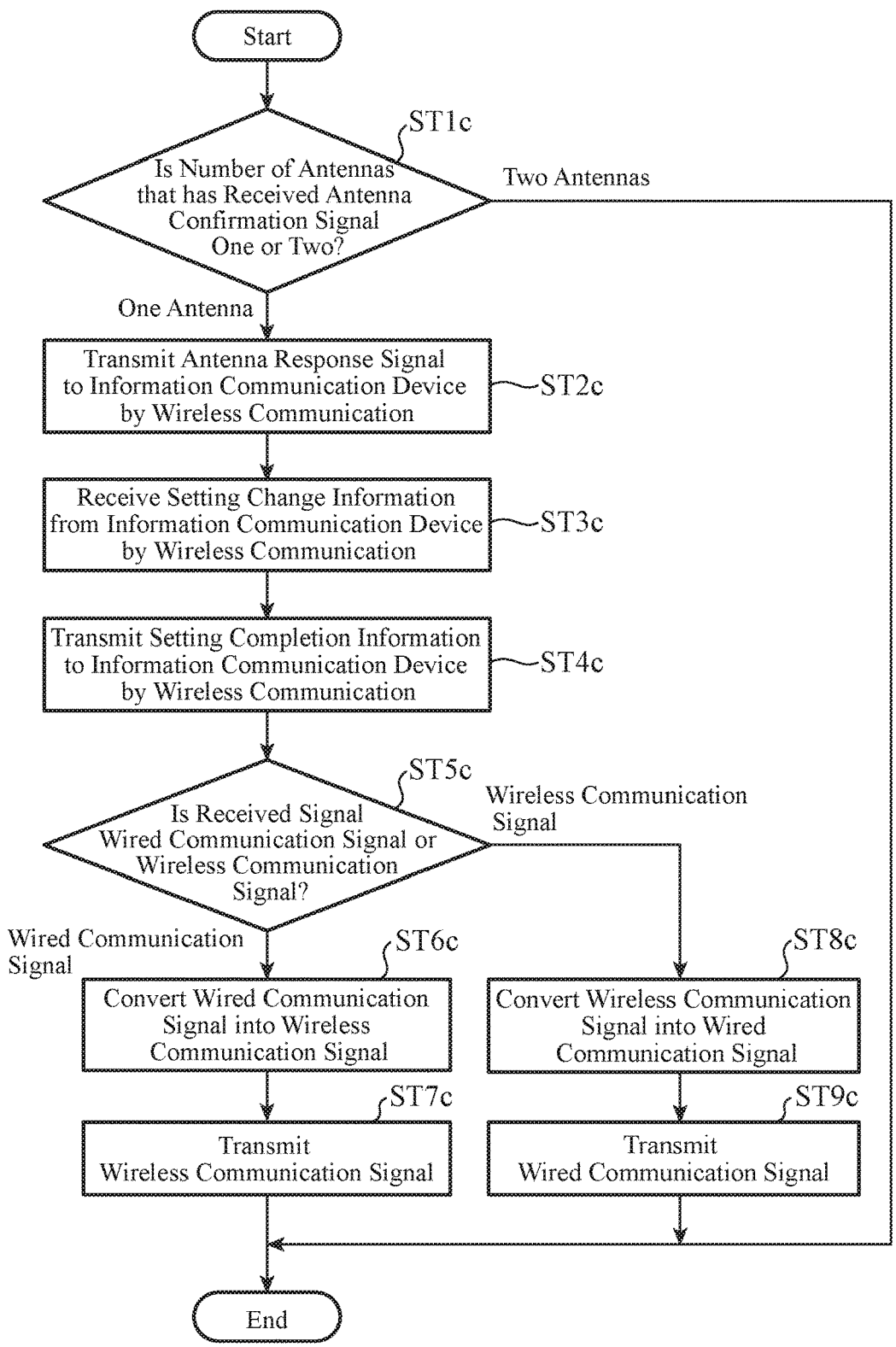
FIG. 11 is a flowchart illustrating an operation of the communication device when an LCX is disconnected.

FIG. 11 is a flowchart illustrating an operation of the communication device when the LCX is disconnected, and illustrates an operation of the communication devices 3a to 3c in the state illustrated in FIG. 9.

The signal processing unit 33 of each of the communication devices 3a to 3c inquires of the wireless communication unit 32 whether the number of the antennas that has received the antenna confirmation signal is one or two (step ST1c).

Here, when the antenna confirmation signal is received by the two LCXs connected at the preceding stage and the subsequent stage of the communication device (two antennas in step ST1c), the signal processing unit 33 determines that there is no disconnection in the LCX, and terminates the processing.

When the antenna confirmation signal is received by only one LCX connected at the preceding stage and the subsequent stage of the communication device (one antenna in step ST1c), the signal processing unit 33 transmits the antenna response signal to the information communication device 2 by wireless communication via the wireless communication unit 32 (step ST2c).

In the case of FIG. 9, respective signal processing units 33 of the communication device 3b and the communication device 3c transmit the antenna response signal to the information communication device 2 by wireless communication via the wireless communication units 32.

Next, the wireless communication units 32 of the communication devices at the preceding stage and the subsequent stage of the disconnection point receive the setting change information from the information communication device 2 via one LCX that is not disconnected (step ST3c).

In the case of FIG. 9, the respective signal processing units 33 of the communication device 3b and the communication device 3c receive the setting change information from the information communication device 2 by wireless communication via the wireless communication units 32.

The wired communication unit 31 of the communication device at the preceding stage of the disconnection point converts the wired signal received via the LCX at the preceding stage and the filter 30 into communication data and outputs the communication data to the signal processing unit 33.

The signal processing unit 33, which has received the setting change information, outputs the communication data input from the wired communication unit 31 to the wireless communication unit 32. The wireless communication unit 32 converts the communication data input from the signal processing unit 33 into the wireless communication signal c.

The wireless communication unit 32 of the communication device at the subsequent stage of the disconnection point converts the received wireless communication signal c into communication data and outputs the communication data to the signal processing unit 33.

The signal processing unit 33, which has received the setting change information, outputs the communication data input from the wireless communication unit 32 to the wired communication unit 31. The wired communication unit 31 converts the communication data input from the signal processing unit 33 into the wired communication signal b.

For example, in the case of FIG. 9, in the communication device 3b, the wired communication signal b is converted into the wireless communication signal c, and in the communication device 3c, the wireless communication signal c is converted into the wired communication signal b.

Thereafter, the signal processing unit 33 transmits the setting completion information to the information communication device 2 by wireless communication via the wireless communication unit 32 (step ST4c).

When the wired communication signal is received by the wired communication unit 31 (wired communication signal in step ST5c), the signal processing unit 33 of the communication device, which has received the setting change information, outputs the communication data converted from the wired communication signal by the wired communication unit 31 to the wireless communication unit 32. The wireless communication unit 32 converts the communication data input from the signal processing unit 33 into a wireless communication signal (step ST6c).

In this way, the wireless communication unit 32 transmits the wireless communication signal by wireless communication via one LCX that is not disconnected (step ST7c).

In the case of FIG. 9, the wireless communication unit 32 of the communication device 3b transmits the wireless communication signal c by wireless communication via the LCX 4b.

On the other hand, when the wireless communication signal is received by the wireless communication unit 32 (wireless communication signal in step ST5c), the signal processing unit 33 of the communication device, which has received the setting change information, outputs the communication data converted from the wireless communication signal by the wireless communication unit 32 to the wired communication unit 31.

The wired communication unit 31 converts the communication data input from the signal processing unit 33 into a wired communication signal (step ST8c).

In this way, the wired communication unit 31 transmits the wired communication signal by wired communication via one LCX that is not disconnected (step ST9c).

In the case of FIG. 9, the wired communication unit 31 of the communication device 3c transmits the wired communication signal b to the information communication device 2 by wired communication via the LCX 4d.

As a result, even if the LCX is disconnected, cutoff of the communication in the network can be avoided.

The information communication system 1 mounted in the vehicle 100 has been described so far. However, the movable body that mounts the information communication system 1 is not limited to the vehicle. For example, the moving body may be a railroad vehicle, an aircraft, or a ship. That is, any moving body may be employed as long as the moving object has a space where the information communication system 1 is mounted.

As described above, the information communication device 2 according to the first embodiment has the configuration illustrated in FIG. 1. Therefore, the information communication device 2 controls the filters 30 of the communication devices 3a to 3c by wired communication via the LCXs to pass or cut off the signal in the wireless frequency band, thereby to adjust the length and the number of antennas implemented by the LCXs. With the configuration, deterioration of the wireless communication quality in the network can be prevented.

In addition, in the information communication device 2 according to the first embodiment, the control unit 22 controls the passage and cutoff of the signal in the wireless frequency band in the filters 30 of the communication devices 3a to 3c by wired communication via the LCXs in accordance with the communication status of the wireless communication unit 21. With the control, the number of the LCXs to function as an antenna can be changed in accordance with the communication status of the wireless communication unit 21 without changing the topology of the network.

Furthermore, the information communication device 2 according to the first embodiment configures the ring topology network with the communication devices 3a to 3c via the LCXs 4a to 4d. In this topology, two LCXs are connected to the information communication device 2. With the configuration, the two LCXs can function as two antennas. Since two LCXs are also connected to the communication device, the number of the LCXs to function as an antenna can be changed and the radiation range of the radio waves can be changed, by controlling the passage and cutoff of the signal in the wireless frequency band in the filter 30.

Furthermore, in the information communication device 2 according to the first embodiment, the control unit 22 controls switching between the wired communication via the LCXs in the communication devices 3a to 3c, and the wireless communication causing the LCXs to function as an antenna. As a result, improvement of the convenience of the network can be achieved.

Furthermore, in the information communication device 2 according to the first embodiment, when the disconnection is detected in the LCX, the control unit 22 converts the wired communication signal to be transmitted from one communication device to another communication device connected with each other by the LCX into the wireless communication signal. Then, the wireless communication signal is transmitted from the one communication device to another communication device by wireless communication. In doing so, even if the LCX is disconnected, the cutoff of the communication in the network can be avoided.

Furthermore, the information communication device 2 according to the first embodiment is mounted on the moving body. Deterioration of the wireless communication quality in the network can be prevented even if the communication status of the wireless communication is changed due to movement of the moving body such as a vehicle.

Furthermore, in the information communication device 2 according to the first embodiment, the control unit 22 controls the passage and cutoff of the signal in the wireless frequency band by the filter 30 to cause the wireless communication unit 21 to perform the diversity wireless communication or the MIMO wireless communication. As a result, the radio waves in the same frequency band are transmitted and received by a plurality of LCXs, and thus improvement of the wireless communication quality and speeding up can be achieved.

Furthermore, the information communication system 1 according to the first embodiment includes the communication devices 3a to 3c each including the filters 30, and the information communication device 2 that configures the network with the communication devices 3a to 3c via the LCXs 4a to 4d connected to the filters 30. With the configuration, the information communication system 1 by which the above-described effect can be obtained can be provided.

Furthermore, an information communication method according to the first embodiment controls the filters 30 of the communication devices 3a to 3c as illustrated in FIG. 5. Therefore, an information communication method by which the above-described effect can be obtained can be implemented.

Second Embodiment

Figure 12A:
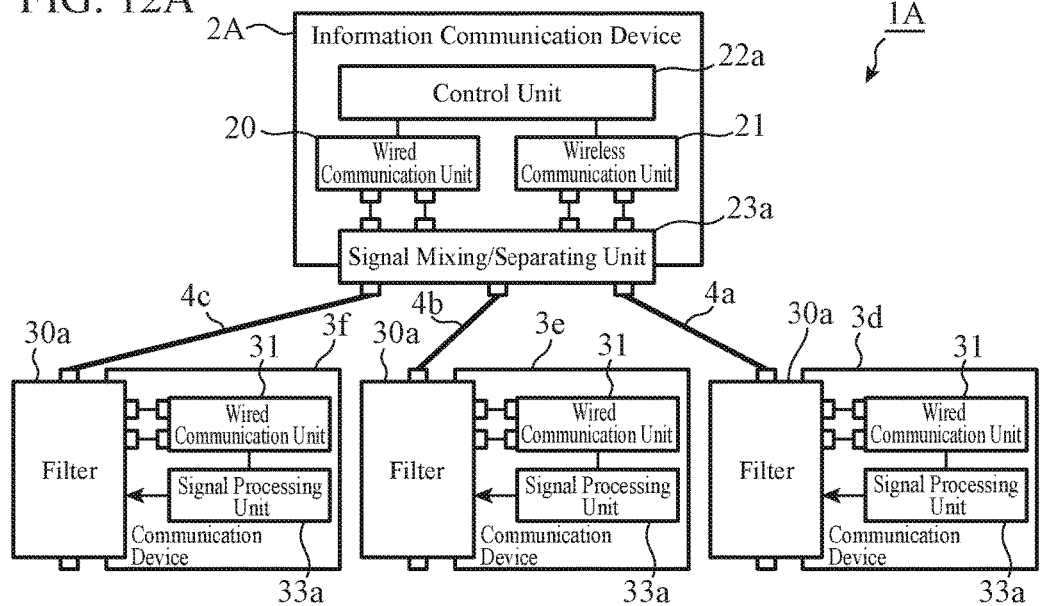
FIG. 12A is a block diagram illustrating a configuration of an information communication system according to a second embodiment of the present invention, and illustrates a case in which the information communication system configures a star topology network.

FIG. 12A is a block diagram illustrating a configuration of an information communication system 1A according to a second embodiment of the present invention, and illustrates a case in which a star topology network is configured.

An signal mixing/separating unit 23a of an information communication device 2A includes input/output terminals by the number of communication devices connected via LCXs. Therefore, in the case of the configuration illustrated in FIG. 12A, the signal mixing/separating unit 23a includes three terminals corresponding to respective communication devices 3d to 3f connected via LCXs 4a to 4c.

Each of the communication devices 3d to 3f includes a filter 30a, a wired communication unit 31, and a signal processing unit 33a. The filter 30a is a filter for passing and cutting off a signal in a wireless frequency band, and the passage and cutoff of the signal in a wireless frequency band are controlled in accordance with a control signal from a control unit 22a of the information communication device 2A. The wired communication unit 31 performs wired communication with the information communication device 2A via the LCX, similarly to the first embodiment.

The signal processing unit 33a outputs communication data addressed to the information communication device 2A to the wired communication unit 31 and processes communication data from the information communication device 2A input from the wired communication unit 31.

Further, the signal processing unit 33a controls the filter 30a to cut off a wireless communication signal from the wireless communication unit 21 in accordance with the control signal of the control unit 22a. With the control, the wireless communication signal is leaked as a radio wave in the LCXs 4a to 4c, and the LCXs 4a to 4c can be caused to function as an antenna. As illustrated in FIG. 12A, in the star topology, all of the plurality of LCXs are connected to the information communication device 2A. Therefore, a larger number of the LCXs can be caused to function as an antenna than the ring topology.

Figure 12B:
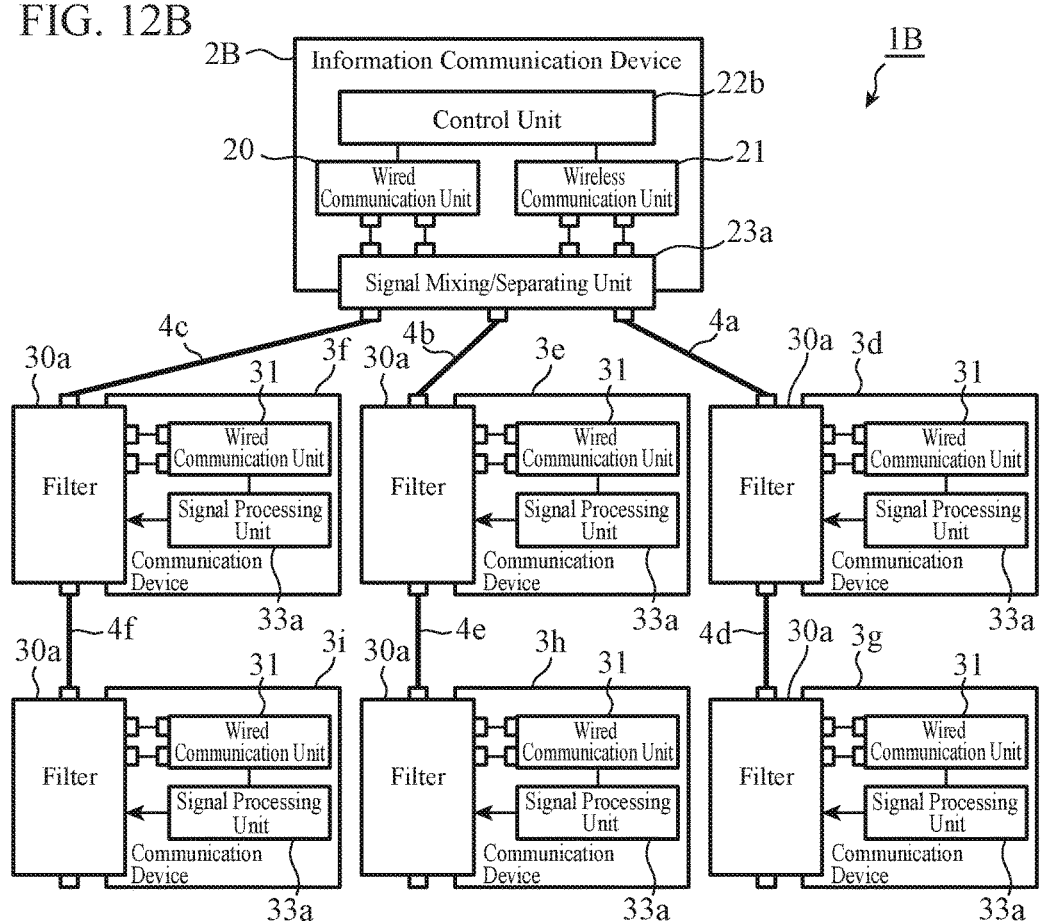
FIG. 12B is a block diagram illustrating a configuration of an information communication system according to the second embodiment of the present invention, and illustrates a case in which the information communication system configures a daisy chain topology network.

FIG. 12B is a block diagram illustrating a configuration of an information communication system 1B according to the second embodiment, and illustrates a case in which a daisy chain topology network is configured.

In the information communication system 1B, communication devices 3g to 3i are connected to subsequent stages of the communication devices 3d to 3f in the information communication system 1A via LCXs 4d to 4f.

The signal processing unit 33a of each of the communication devices 3d to 3f controls the filter 30a to pass the wireless communication signal from the wireless communication unit 21 in accordance with a control signal of a control unit 22b.

In addition, the signal processing unit 33a of each of the communication devices 3g to 3i controls the filter 30a to cut off the wireless communication signal from the wireless communication unit 21 in accordance with a control signal of the control unit 22b.

As a result, the LCX 4a and the LCX 4d can be caused to function as one antenna, the LCX 4b and the LCX 4e can be caused to function as one antenna, and the LCX 4c and the LCX 4f can be caused to function as one antenna.

In this way, the daisy chain topology can cause a larger number of the LCXs to function as an antenna than the ring topology, similarly to the star topology.

Furthermore, two LCXs are also connected to each of the communication devices 3d to 3f on the information communication device 2B side. Therefore, these LCXs can be caused to function as one antenna, and the length of the antenna implemented by the LCXs can be adjusted.

As described above, the information communication system 1A or 1B according to the second embodiment configures the start topology network or the daisy chain topology network with the communication devices 3a to 3c or the communication devices 3a to 3f via the LCXs 4a to 4c or the LCXs 4a to 4f.

In the star topology, all the LCXs 4a to 4c are connected to the information communication device 2A. Therefore, a larger number of the LCXs can be caused to function as an antenna than the ring topology. Therefore, diversity or MIMO wireless communication using many antennas is possible.

Further, the daisy chain topology can cause a larger number of the LCXs to function as an antenna than the ring topology, similarly to the star topology. Therefore, diversity or MIMO wireless communication using many antennas is possible.

Furthermore, two LCXs are also connected to each of the communication devices 3d to 3f on the side of the information communication device 2B. Therefore, these LCXs can be caused to function as one antenna.

That is, the length of the antenna implemented by the LCXs can be adjusted, similarly to the ring topology.

Note that the present invention allows a combination of the embodiments, a modification of any constituent element of the embodiments, and an omission of any constituent element in the embodiments within the scope of the invention.

INDUSTRIAL APPLICABILITY

The information communication device according to the present invention can prevent deterioration of the wireless communication quality in the network configured with the plurality of communication devices via the plurality of LCXs, and is thus favorable for an information communication device for vehicle having a possibility of change of the communication status due to movement of the vehicle, for example.

REFERENCE SIGNS LIST 1, 1A, 1B: Information communication system, 2, 2A, 2B: Information communication device, 3a to 3i: Communication device, 5, 6a to 6d: Mobile communication terminal, 20, 31: Wired communication unit, 21, 32: Wireless communication unit, 22, 22a, 22b: Control unit, 23, 23a, 23b: Signal mixing/separating unit, 30, 30a: Filter, 33, 33a: Signal processing unit, 100: Vehicle, 100a: Driver's seat, 100b: Passenger seat, 100c: Back seat, 230, 231: Mixing/separating circuit, 300a, 300b: Wired filter, 301a, 301b: Wireless filter, 302 to 304: Band-pass filter, 305 to 309: Switch.

The invention claimed is:

1. An information communication device comprising:
a wired communicator to perform wired communication with a plurality of communication devices via a plurality of leaky coaxial cables connected to filters each provided in the plurality of communication devices;
a wireless communicator to transmit and receive a signal in a wireless frequency band, using the leaky coaxial cable as an antenna;
a signal mixing/separator to mix signals from the wired communicator and the wireless communicator and output the mixed signal to the leaky coaxial cable, and to separate signals received from the leaky coaxial cable into a signal provided to the wired communicator and a signal provided to the wireless communicator; and
a controller to control the filters of the communication devices by wired communication via the leaky coaxial cable to pass or cut off the signal in a wireless frequency band of each of the filters of the communication devices to cause the plurality of leaky coaxial cables to function as a single antenna or a plurality of antennas.

2. The information communication device according to claim 1, wherein the controller controls passage and cutoff of the signal in a wireless frequency band in the filter of the communication device by the wired communication via the leaky coaxial cable in accordance with a communication status of the wireless communicator.

3. The information communication device according to claim 1, wherein a ring topology network is configured between the information communication device and the plurality of communication devices via the plurality of leaky coaxial cables.

4. The information communication device according to claim 3, wherein the controller controls switching between the wired communication via the leaky coaxial cable and wireless communication causing the leaky coaxial cable to function as an antenna, in the plurality of communication devices.

5. The information communication device according to claim 3, wherein when disconnection of the leaky coaxial cable is detected, the controller converts a wired communication signal to be transmitted from one communication device to another communication device connected to each other by the leaky coaxial cable into a wireless communication signal, and transmits the wireless communication signal from the one communication device to said another communication device by wireless communication.

6. The information communication device according to claim 1, wherein a star topology network or a daisy chain topology network is configured between the information communication device and the plurality of communication devices via the plurality of leaky coaxial cables.

7. The information communication device according to claim 1, wherein the information communication device is mounted in a moving body.

8. The information communication device according to claim 1, wherein the controller controls passage and cutoff of the signal in a wireless frequency band by the filter to cause the wireless communicator to perform diversity wireless communication or multiple input/output wireless communication, in which the plurality of leaky coaxial cables function as an antenna.

9. An information communication system comprising:
a plurality of communication devices each including filters to pass and cut off a signal in a wireless frequency band; and
the information communication device according to claim 1, to configure a network with the plurality of communication devices via the plurality of leaky coaxial cables connected to the filters.

10. An information communication method comprising:
confirming, by a controller, a communication status of a wireless communicator;
determining, by the controller, a leaky coaxial cable caused to function as an antenna, of a plurality of leaky coaxial cables connected to filters each provided in a plurality of communication devices in accordance with the communication status of the wireless communicator; and
controlling, by the controller, the filters of the communication devices by wired communication via the leaky coaxial cable to pass or cut off a signal in a wireless frequency band of each of the filters of the communication devices to cause the leaky coaxial cable selected in the determining step to function as an antenna.

* * * * *